United States Patent
Subramaniam et al.

(10) Patent No.: US 9,727,681 B2
(45) Date of Patent: Aug. 8, 2017

(54) GENERATING SPECIFIC MEMORY MODELS USING GENERIC MEMORY MODELS FOR DESIGNING MEMORIES IN VLSI DESIGN

(71) Applicant: eSilicon Corporation, San Jose, CA (US)

(72) Inventors: Prasad Subramaniam, New Providence, NJ (US); Hai Phuong, Solana Beach, CA (US)

(73) Assignee: eSilicon Corporation, San Jose, CA (US)

( * ) Notice: Subject to any disclaimer, the term of this patent is extended or adjusted under 35 U.S.C. 154(b) by 77 days.

(21) Appl. No.: 14/628,668

(22) Filed: Feb. 23, 2015

(65) Prior Publication Data

US 2016/0246909 A1     Aug. 25, 2016

Related U.S. Application Data

(63) Continuation of application No. 14/628,105, filed on Feb. 20, 2015.

(51) Int. Cl.
*G06F 17/50*      (2006.01)

(52) U.S. Cl.
CPC ........ *G06F 17/5068* (2013.01); *G06F 17/505* (2013.01); *G06F 17/5009* (2013.01); *G06F 17/5031* (2013.01)

(58) Field of Classification Search
USPC ....................................... 716/110
See application file for complete search history.

(56) References Cited

U.S. PATENT DOCUMENTS

| | | | | |
|---|---|---|---|---|
| 7,415,686 B2* | 8/2008 | Andreev | ................... | G11C 5/04 714/718 |
| 2006/0107247 A1* | 5/2006 | Andreev | ............. | G06F 17/5072 716/103 |
| 2007/0113212 A1* | 5/2007 | Andreev | ............. | G06F 17/5068 716/122 |
| 2011/0260318 A1* | 10/2011 | Eisenstadt | ........... | G06F 17/5054 257/737 |

OTHER PUBLICATIONS

Office Action for U.S. Appl. No. 14/628,676, Sep. 8, 2016, 19 Pages.

* cited by examiner

*Primary Examiner* — Eric Lee
(74) *Attorney, Agent, or Firm* — Fenwick & West LLP

(57) ABSTRACT

Memory optimization of integrated circuit (IC) design using generic memory models is presented. One method includes accessing a register transfer level (RTL) description for the IC design that includes generic memory interface calls to generic memory models for each memory instance. The generic memory call interface includes a set of memory parameters. The method also includes processing the RTL description of the IC design as a step in a design flow for the IC design by processing specific memory models for the memory instances, wherein the specific memory model for each memory instance is generated from the generic memory model using the memory parameters corresponding to the memory instance. The method can also include generating specific memory models (e.g., simulation model, timing model, and layout model) for each memory instance based on a given set of values of memory parameters for the memory instance.

20 Claims, 5 Drawing Sheets

GENERATING SPECIFIC MEMORY MODELS USING GENERIC MEMORY MODELS FOR DESIGNING MEMORIES IN VLSI DESIGN

CROSS REFERENCE TO RELATED APPLICATION

This application is a continuation of U.S. patent application Ser. No. 14/628,105, titled "Memory Optimization in VLSI Design Using Generic Memory Models," filed Feb. 20, 2015, which is incorporated by reference in its entirety.

BACKGROUND

1. Field of the Invention

This invention relates generally to memory optimization in very large scale integrated circuit (VLSI) design and specifically to memory optimization in VLSI design using generic memory models.

2. Description of Related Art

Integrated circuits and their designs are getting more and more complex. A typical design cycle may last a year or more and costs millions of dollars. With a long and expensive design cycle, it is important to make appropriate choices for, among others, memory instances. It is not uncommon for advanced system-on-chip (SoC) designs to include over a thousand memory instances occupying up to half of the design's die area. The memory consumes a significant portion of the SoC's power and may limit the SoC's performance. Accordingly, optimizing memory performance in an SoC is becoming ever more important.

Memory selection typically occurs early in the SoC design process. The designer typically can choose from many different memories available from many different memory suppliers. With advances in process technology, memory suppliers are providing an increasing number of options and design choices to make power, performance, and area (PPA) trade-offs when selecting memories.

Once a memory instance is selected, it is instantiated in a register transfer level (RTL) description of the SoC design, which is used in the rest of the design flow for the integrated circuit design. However, after this point, it is more difficult to change the memory selection as it takes some time and effort to change the RTL description. The design flow is disrupted as the RTL description is modified, corresponding changes may have to be made in other descriptions or models, and later steps in the design flow may have to be repeated using the modified RTL. In addition, the modified RTL must be re-verified. Given this disruption, once a memory architecture is selected and coded into the RTL description, there is a disincentive to change this later during the design cycle. This can make it more difficult to take advantage of the increasing number of design choices provided by memory suppliers and silicon technologies. In addition, this can have a significant impact on the overall SoC performance, area, and power since memories account for a significant portion of an SoC design.

SUMMARY

The present invention overcomes the limitations of the prior art by implementing memory optimization of integrated circuit (IC) design using generic memory models that are technology and memory vendor independent.

In one aspect, a register transfer level (RTL) description of an IC design includes calls to a generic memory model. The calls use a generic memory call interface, but different calls use different parameters to represent different instances of memory within the IC. Exemplary parameters include a depth parameter defining a number of words in a memory instance, a data width parameter defining a number of bits in each word, and parameters defining other memory features like pipeline/non-pipeline, bit-write masking, and the like.

In another aspect, specific memory models for each memory instance (e.g., simulation model, timing model, test model, and layout model) are generated based on the calls and their memory parameters. The specific memory models are processed during different phases of the IC design flow, for example during functional simulation, timing analysis, test development, and place & route. Memory instances can be optimized during the design process by changing their memory parameters, but without otherwise requiring modification to the RTL description of the IC design.

Other aspects include components, devices, systems, improvements, methods, processes, applications and other technologies related to the foregoing.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
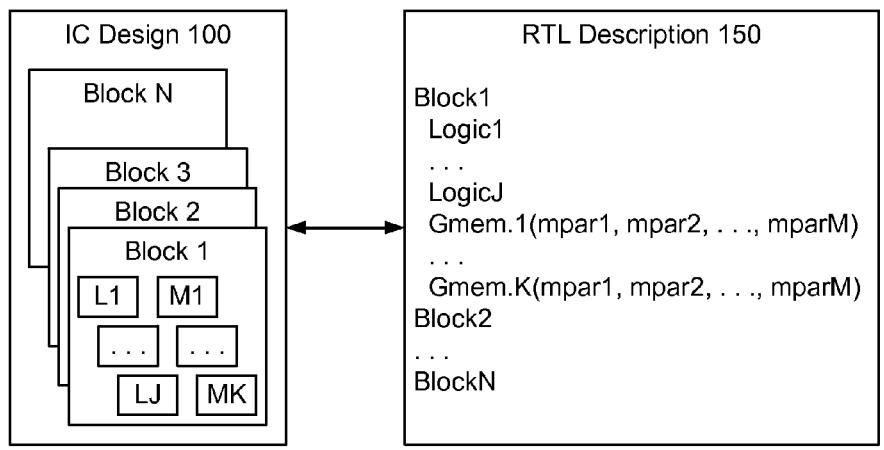
FIG. 1 is a block diagram illustrating a register transfer level (RTL) description of an integrated circuit (IC) design, according to one embodiment.

FIG. 1 is a block diagram illustrating a register transfer level (RTL) description of an integrated circuit (IC) design, according to one embodiment. FIG. 1 shows an IC design 100 on the left hand side and its equivalent RTL description 150 on the right hand side. The IC design is a design that a user desires to optimize, including typically for power, performance, and area (PPA) metrics. In one embodiment, the IC design is a design for a system-on-chip (SoC). The IC design includes multiple blocks, for example, blocks 1 through N. Each block includes circuit components, including logic components, for example L1 through LJ for block 1, and memory components, for example M1 through MK for block 1.

The RTL description 150 is an RTL description of the IC design 100. The RTL description is typically created using hardware description languages such as VHDL or Verilog. The RTL description for the IC design includes RTL descriptions for each block of the IC design and each logic component and memory component within each block as well. For example, block1 includes 1:K memory instances and each one of the K memory instances has a corresponding RTL description in RTL description 150.

In this example, the RTL description of each memory instance M1-MK includes a call to a generic memory model (e.g., Gmem) by using a generic memory call interface. The notation Gmem.k indicates that this is the kth instance of a call to the generic memory model Gmem. The generic memory call interface includes a plurality of memory parameters (e.g., mpar1 through mparM). For the K memory instances shown, there are K calls to the generic memory model. In one embodiment, the memory parameters are defined in a file that is separate from a file including the RTL description. Alternatively, the memory parameters are defined in the same file as the RTL description.

The memory parameters, mpar, included in the generic memory call interface are parameters that describe the various properties of a memory instance. An exemplary list of memory parameters includes the following:

depth parameter defining a number of words in a memory
data width parameter defining a number of bits in each word
port parameter defining a number of read/write ports in a memory
register flag parameter defining whether an output of the memory is pipelined or non-pipelined
bit-write flag defining whether bit-write functionality is enabled for the memory
read utilization parameter defining read activity rate
write utilization parameter defining write activity rate
read X flag defining whether to generate memory output read data with an unknown state (X)
read/write X flag defining whether to generate memory output read data with an unknown state (X) when read/write to a same memory address
read/write check flag defining whether to check if read/write are to a same address in the memory
data in check flag defining whether to check for an unknown write data bus
data out check flag defining whether to check for unknown read data
memory clock parameter defining a clock (e.g., frequency of the clock) for the memory
flops parameter defining whether to implement memory with flip-flop
vendor parameter defining the memory vendor for the memory
gperf parameter indicating whether to use the highest performance memory
gpwr parameter indicating whether to use the lowest leakage memory
gmux parameter defining a desired row/col option for the memory By using different parameters in each call, the same generic memory model can be used to describe different memory instances. In addition, if a memory instance is described by a call to the generic memory model, the memory instance can be changed by changing the memory parameters, without requiring modifications to the RTL description of the IC design, including the call to the generic memory model in the RTL description.

Figure 2:
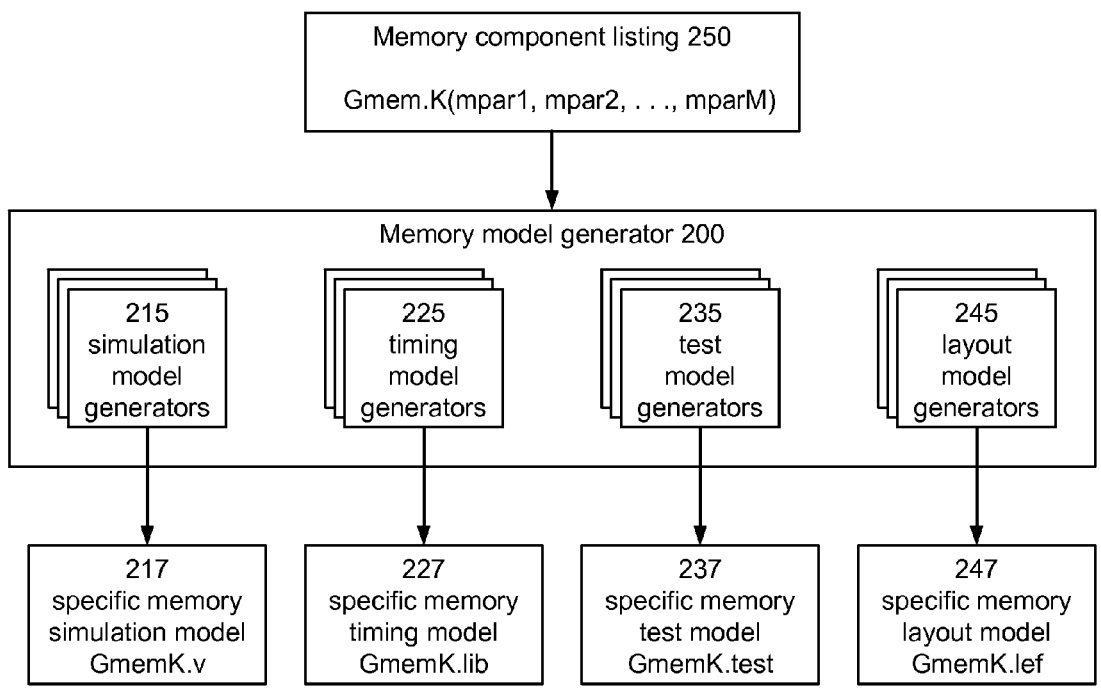
FIG. 2 is a block diagram illustrating a generation of memory models using the RTL description of FIG. 1, according to one embodiment.

FIG. 2 is a block diagram illustrating generation of memory models using the RTL description of FIG. 1, according to one embodiment. FIG. 2 includes a listing of memory components 250 in the IC design and a memory model generator 200. The memory model generator 200 includes many different model generators 215, 225, 235, 245. These model generators can be used to generate memory models 217, 227, 237, 247 for each specific memory instance, based on the memory parameters passed for that memory instance. To avoid confusion, these memory models 217, 227, 237, 247 will be referred to as specific memory models, because they are for specific memory instances. In contrast, Gmem is a call to a generic memory model because the call interface is generic enough to accommodate many different types of memory models, as will be described in greater detail below.

Memory component listing 250 is a listing of memory instances (M1:MK) of the IC design. For purposes of illustration, the memory component listing 250 shown in FIG. 2 only includes the call for the Kth memory instance of Block1. FIG. 2 will be used to explain how specific memory models 217, 227, 237, 247 are generated for memory instance MK, but the process is equally applicable to calls for other memory instances.

Memory model generator 200 is a collection of tools that implements the generic memory model. Memory model generator 200 generates different types of memory models, depending in part on the memory parameters. The "generic memory model" includes the ability to generate these different models. Different memory models are useful for different tasks within the design flow for designing an integrated circuit.

In the example of FIG. 2, the memory models that could be generated include simulation models, timing models, test models, and layout models. The simulation model is used in the design flow to perform a functional simulation of the memory. The specific memory simulation model 217 in this example is a Verilog model, specifically a .v model. In FIG. 2, it is denoted as GmemK.v because it is the .v model for the kth memory instance. The timing model is used to perform timing analysis of the memory. In this example, it is a .lib model, denoted as GmemK.lib. The test model is used during test vector insertion and development to verify test vector functionality. It is denoted as GmemK.test. The layout model is used during place and route of the memory. It is a .lef model, denoted by GmemK.lef.

The simulation models for a specific memory instance (i.e., specific memory simulation models 217) are generated by simulation model generators 215. The specific memory timing models 227 are generated by timing model generators 225. The specific memory test models 237 are generated by test model generators 235. The specific memory layout models 247 are generated by layout model generators 245.

There can be multiple versions of each of the simulation, timing, test and layout model generators 215, 225, 235, 245, all of which are included as part of the overall "generic memory model." For example, different model generators can be used to model different technology nodes (i.e., geometry size, foundry and/or process variant). If one of the memory parameters defines the technology node, then that parameter may determine which specific model generator should be used to generate the corresponding specific memory models. In this case, the generic memory model is flexible enough to accommodate different technology nodes.

As another example, model generators can also be provided for different memory compilers or by different memory suppliers. Thus, if a memory parameter specifies a certain memory compiler or memory from a certain supplier, the corresponding specific memory models can be generated by the memory model generator 200. The memory model generator 200 may call a separate memory compiler. In that case, if the called memory compiler uses a call interface that is different than the generic memory call interface, the generic memory model may also include a wrapper for the memory compiler so that the generic memory model can seamlessly interface with the external memory compiler.

The generic memory model can be modified by changing, adding or removing different model generators from the memory model generator 200. This can be done without requiring any modification to the RTL description of the IC design and without requiring any modification to the call to the generic memory model. For example, the generic memory model can be modified to more accurately represent the memory instances of the IC design as the process of designing the IC progresses. For example, as the IC design becomes more mature, with the IC design cycle progressing from a functional simulation to a timing analysis and then to a place & route analysis, the generic memory model can be modified to more closely represent the memory instance at the corresponding stage of the IC design cycle. For example, different memory compilers may be added or removed from the memory model generator, as instances from different memory suppliers are added or removed from the IC design. As another example, less accurate but faster model generators may be used early in the IC design process, and then replaced with more accurate but slower model generators later in the IC design process. An advantage of using the generic memory model is an ability to add additional functionality to the generic memory models without having to modify the RTL description of the IC design and the call to the generic memory model.

In one embodiment, the memory models are written in synthesizable RTL description. For example, memory models can be written in Verilog or SVerilog, an IEEE standard language.

Returning to FIG. 2, the memory model generator 200 receives the memory parameters (i.e., mpar1-mparM) from the call to the generic memory model. It uses these parameters to select the appropriate model generators 215, 225, 235, 245 and to generate the corresponding specific memory models 217, 225, 237, 247. For each memory instance, specific memory models are generated by the memory model generator by using the generic memory model 200 and the memory parameters.

The specific memory models 217, 227, 237, 247 are used in various parts of the design flow, for example to evaluate PPA metrics of the memory instances. In one approach, the specific memory models are collected into a library and accessed from the library during the design flow.

Figure 3:
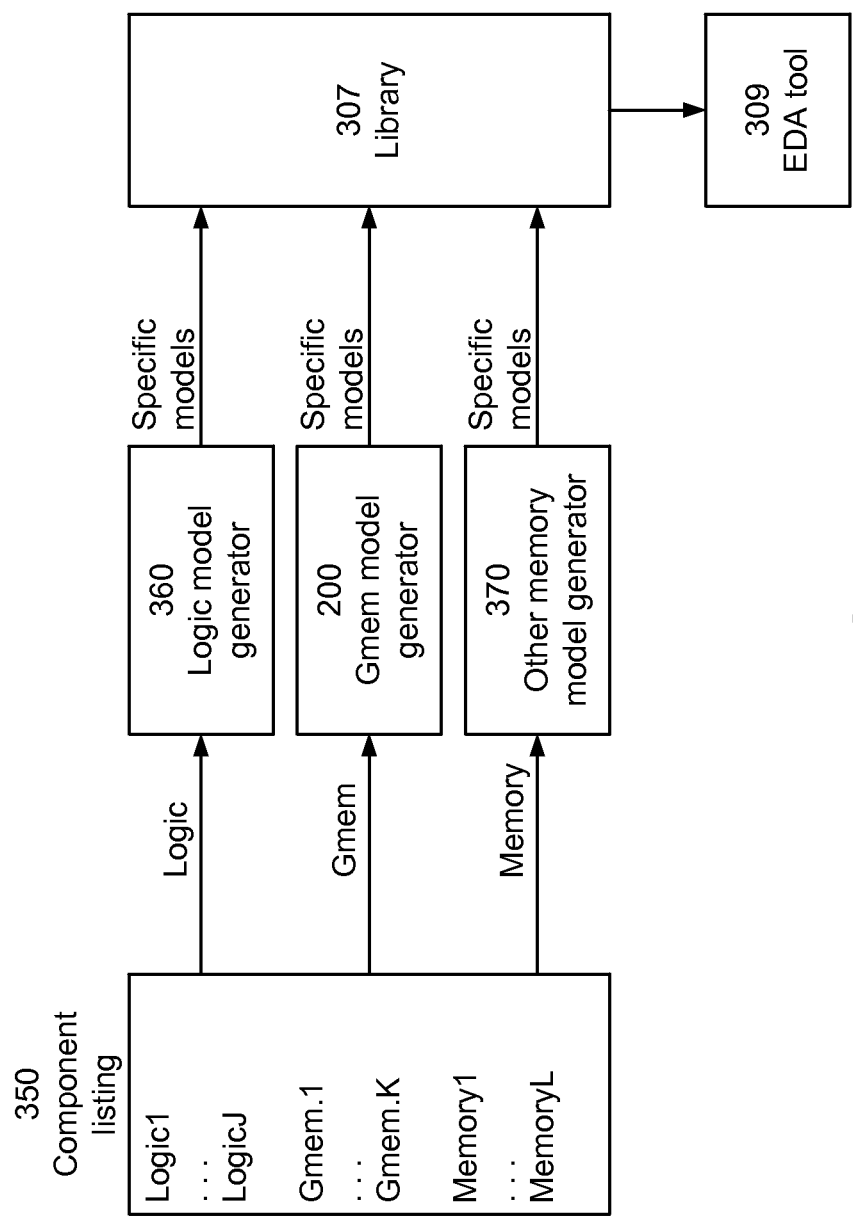
FIG. 3 is a block diagram of generating a library of specific models for logic and memory of the IC design, according to one embodiment.

FIG. 3 is a block diagram of generating a library of specific models for logic and memory of the IC design, according to one embodiment. FIG. 3 shows a listing 350 of logic and memory components in the IC design. The listing includes logic instances Logic1 through LogicJ, memory instances Gmem.1 through Gmem.K which use the generic memory model, and additional memory instances Memory1 through MemoryL. FIG. 3 also shows model generators that generate specific models for logic and memory. Logic model generator 360 generates specific models for the logic components (i.e., Logic1:J). Gmem model generator 200 is the generic memory model generator 200 described above with reference to FIG. 2. It generates specific memory models for memories that use the generic memory model. Other memory instances Memory1 through MemoryL may be described but not using the generic memory model. Other memory model generators 370 may be used to generate the specific models for memory components that do not use the generic memory model.

Library 307 collects the specific models for the logic and memory components in the listing 350. Library 307 can include separate libraries of simulation models, timing models, test models, and layout models. EDA tool 309 evaluates the IC design by using the specific models in library 307. The EDA tool uses the simulation model library for performing a functional simulation, the timing model library for performing a timing analysis, the test model library for test development, and the layout model library for performing place & route analysis. The evaluation of the IC design using the specific models of the library 307 is further described below with reference to FIG. 4.

Figure 4:
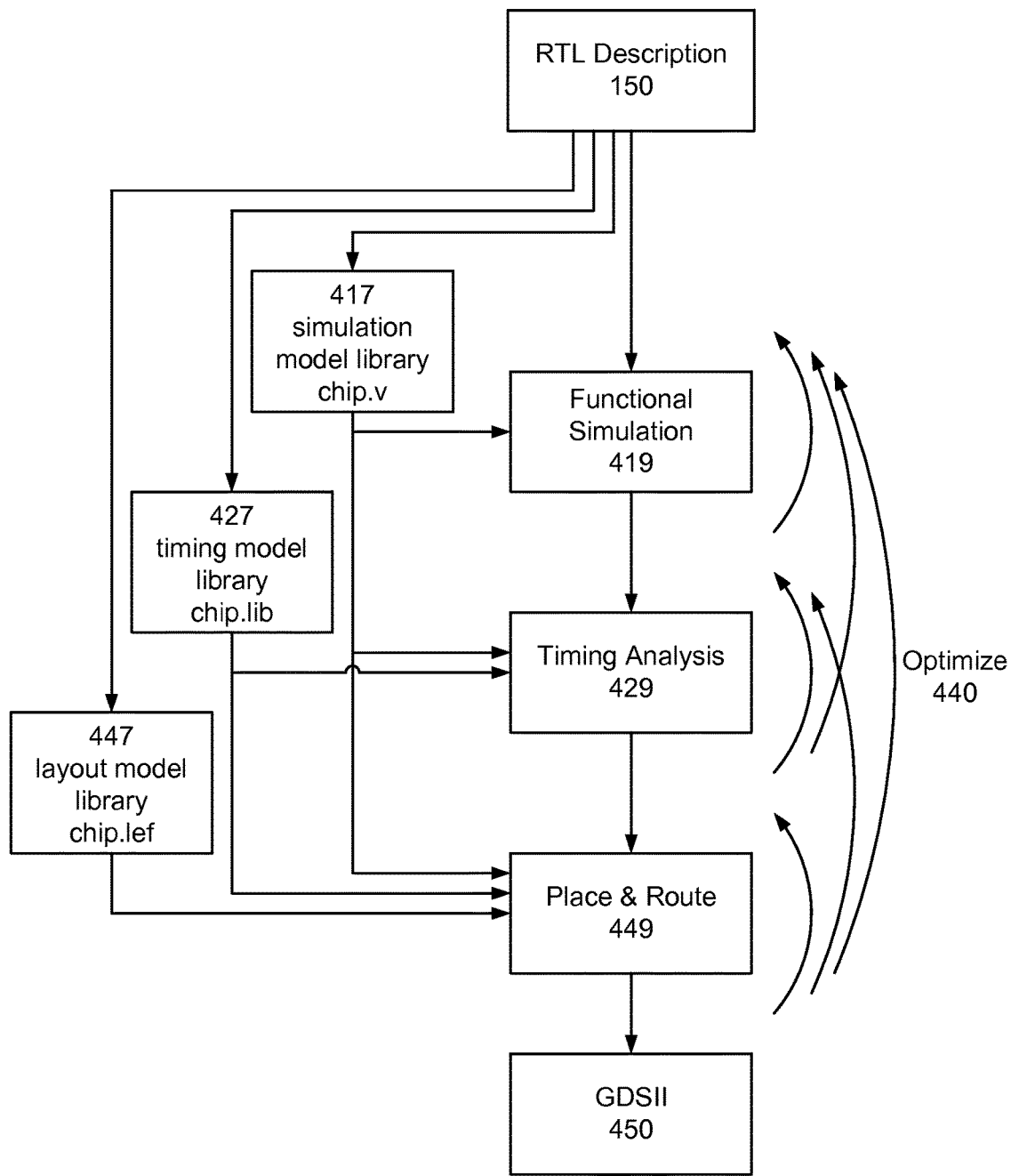
FIG. 4 is a flowchart illustrating a design flow for IC design using the specific models of FIG. 3, according to one embodiment.

FIG. 4 is a flowchart illustrating a design flow of the IC design using the specific models of FIG. 3, according to one embodiment. The design flow shown in FIG. 4 is a simplified flow of a typical design flow of a digital IC design. The design flow begins with an RTL description 150 for the IC design. The RTL description 150 is described above with reference to FIG. 1. The IC design is evaluated at various levels of abstraction such as a functional simulation 419, a timing analysis 429, and a place & route analysis 449. The design flow also includes optimizing 440 the IC design, in part by modifying the memory instances in the IC design by changing one or more of the memory parameters, mpar, without having to change the RTL description 150.

Functional simulation 419 is performed on the IC design using the simulation models for components. The simulation models for the components reside in a simulation model library 417, chip.v. The simulation model library includes specific models for the logic components, memory instances using generic memory models, and other memory instances, as described above with reference to FIG. 3. The functional simulation 419 is performed to evaluate the logic function of the IC design. Based on the functional simulation, the IC design can be optimized 440 to improve the IC design.

At some point in the design flow, the RTL description is synthesized to a gate-level netlist. Timing analysis 429 is performed on the IC design by using simulation models and timing models for the components. The simulation models for all components reside in a simulation model library 417, chip.v, and the timing models reside in a timing model library 427, chip.lib. Depending on the results of the timing analysis, the IC design can be further optimized 440.

Place & route 449 is another step in the design flow. Place & route analysis 449 is performed on the IC design by using simulation models, timing models, and layout models. The simulation models for all components reside in a simulation model library 417, chip.v, the timing models reside in a timing model library 427, chip.lib, and the layout models reside in a layout model simulation library, chip.lef. Again, the IC design can be optimized 440 based on the place & route analysis.

The three steps 419, 429, 449 shown are just some tasks performed during a design flow. These tasks can be performed in various orders and often the overall process is iterative, so that some tasks may be re-performed after the IC design has been modified. Optimization 440 also includes multiple stages and is an important part of the overall design flow. The optimization of the IC design can include changing the RTL description corresponding to the logic components and the other memory components. For the memory instances using the generic memory call, the memory instances can be modified by modifying the memory parameters but without otherwise modifying the corresponding RTL description. That is, when a technology and/or a memory vendor is to be changed, the memory instances can be modified by changing the parameters corresponding to the technology and/or memory vendor and without having to change the actual RTL description of the memory instances.

The final output of the design flow is a description of the IC design 450 suitable for use in chip fabrication. Typically, this uses an industry standard database file format, e.g., GDSII format. It is understood that the design flow described above is merely exemplary and that a typical IC design flow might include additional and/or alternate steps to the ones described above.

Figure 5:
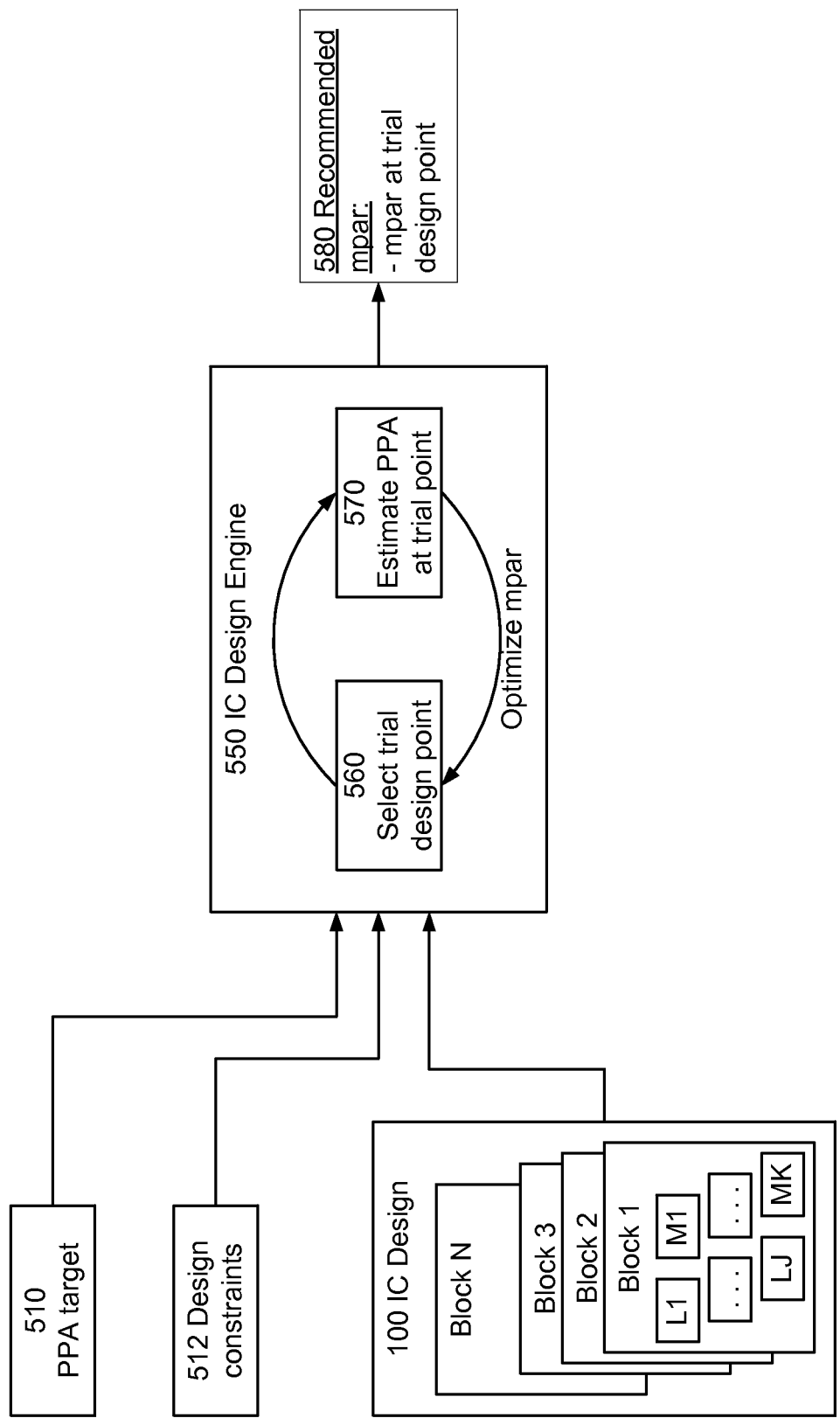
FIG. 5 is a block diagram illustrating memory optimization of an IC design, according to one embodiment.

FIG. 4 illustrated a design flow that typically begins after the technology node has been selected. FIG. 5 is a block diagram illustrating a higher level memory optimization of the IC design, according to one embodiment, for example to select an appropriate technology node. FIG. 5 shows IC design engine 550 that receives an IC design 100 along with a PPA (power, performance, area) target 510 and design constraints 512. For different trial design points, the IC design engine processes the received information and calculates the PPA for that trial design point. It analyzes the possible design space for the IC design based on the trial PPAs (i.e., calculated PPAs for trial design points) and the PPA target. It recommends 580 a trial design point.

With respect to memory instances which are represented using a generic memory model, the IC design engine 550 can optimize those memory instances by optimizing their memory parameters, mpar. The trial design point 580 can be defined by recommended mpar values that meet the target PPA.

In more detail, the recommended design point 580 is a design point that is defined to include of plurality of parameters associated with optimizing the IC design. The plurality of parameters can be organized into three categories such as technology node parameters, library/memory parameters, and operating conditions parameters. Technology node parameters include parameters for selecting a node geometry (e.g., 45 nm), a foundry (e.g., TSMC), and a node variant (e.g., low power variant). Library/memory parameters typically include separate sets of parameters for logic and memory. The set of logic parameters include parameters for selecting library vendor (e.g., ARM), number of tracks (e.g., 7, 8, etc), threshold voltage choice (e.g., nominal, low etc), and channel length (e.g., nominal, long, and short). The set of memory parameters include parameters for:

selecting a number of ports, type of port (read/write);
number of words in memory;
number of bits per word;
mux representing how the words are organized;
banks representing how a memory sub array is organized;
redundancy to provide additional rows or columns in the memory array for repair;
pipeline that enables pipelining of memory output;
Built-In-Self-Test logic or hooks to such test logic;
power management features that enable the memory to conserve power when not in operation;
tech representing the technology node used for the memory; and
vendor representing the memory vendor providing the memory.

Operating conditions parameters include parameters for representing process corner (e.g., nominal, slow, and fast), power supply voltage (e.g., 1.0V), and junction temperature (e.g., 125 C).

PPA target 510 is a PPA metric that the user wants the IC design to meet when the IC design engine estimates IC design 100 at various design points. That is, the IC design engine uses PPA target 510 to determine whether an evaluated PPA metric of a particular memory configuration of the IC design (i.e., a set of values for mpar being used by the memory instances using generic memory instances) meets the PPA target. The PPA target can include at least one of a power metric, a performance metric, and an area metric. For example, the power metric can include dynamic power consumption and/or leakage power consumption of the IC design. The performance metric can include, for example, an operating frequency of the IC design. The area metric can include, for example, a silicon die area for the IC design. In one embodiment, PPA target 510 includes all metrics associated with power, performance, and area. Alternatively, PPA target 510 includes one of either a power metric, a performance metric, or an area metric. Yet in another embodiment, PPA target 510 includes any two metrics associated with power, performance, and area.

Design constraints 512 can include one or more conditions on one or more parameters of design points or memory parameters that are used for optimizing the IC design. For example, design constraints 512 include a condition that a range of allowed supply voltage for the IC design should be +/−10% from the nominal value. Accordingly, the IC design engine would apply the condition on supply voltage as an additional criterion on top of the parameters used for each design point in complying with PPA target 510. For example, the IC design engine would only estimate IC design at those design points that have a supply voltage variation of less than or equal to +/−10% as specified by design constraints 512. Alternatively, the design constraints include a specific condition on one of the memory parameters. For example, the design constraints can include a condition on the data width parameter by specifying that the data width needs to be at least four bits wide. Accordingly, the IC design engine would apply the condition on such that only those memories that have a data width of four or more bits are evaluated during the optimizing of the memory.

The IC design engine receives the IC design along with any applicable design constraints 512 to provide recommended memory parameters 580 that meet PPA target 510. To provide recommended memory parameter values 580, the IC design engine iteratively optimizes the design where the design engine selects 560 a trial design point and estimates 570 PPA metric of the IC design at the selected trial design point at each iteration.

Figure 6:
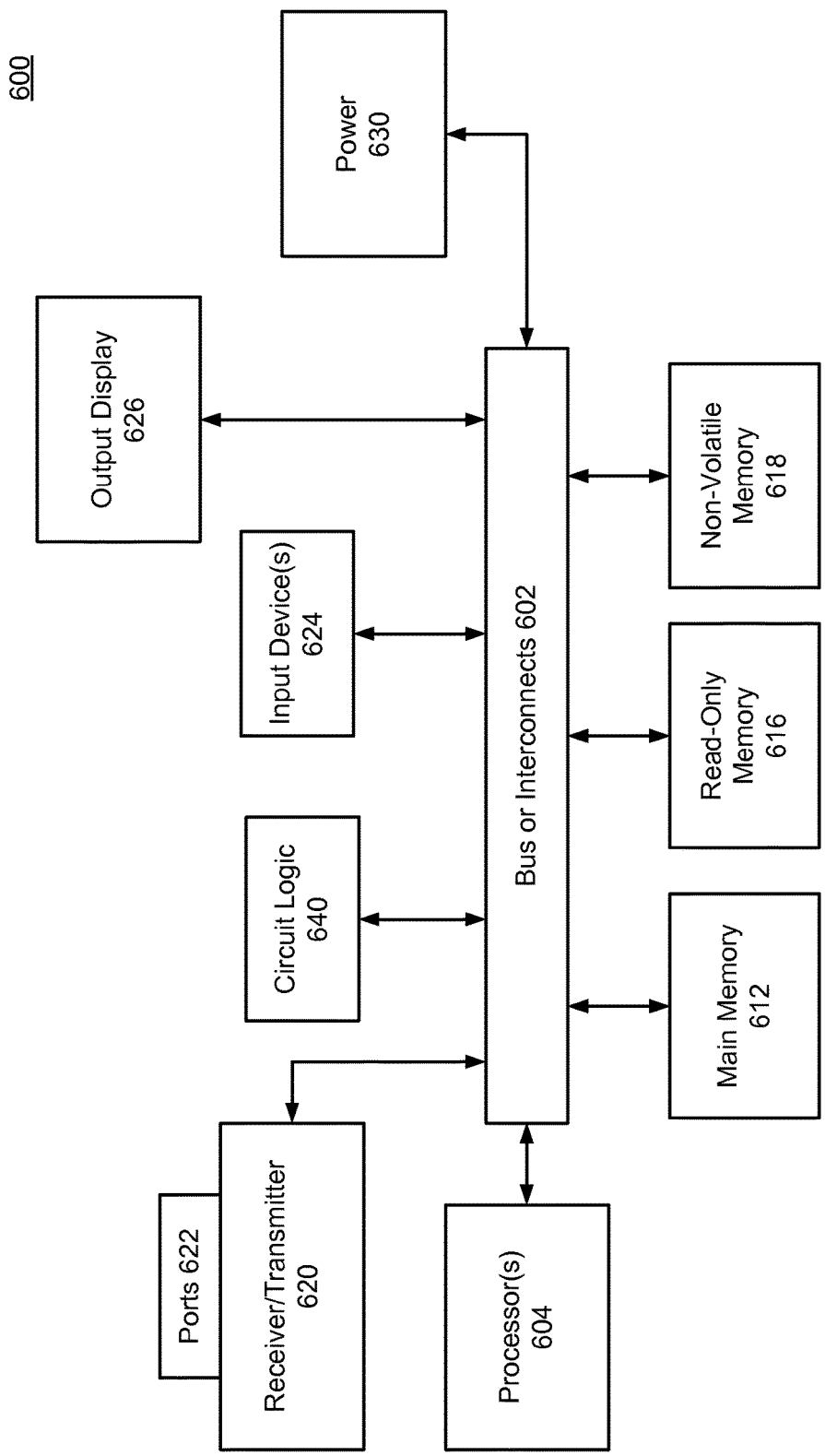
FIG. 6 is a block diagram of a special-purpose computing device that can optimize memory in VLSI design using generic memory models, according to one embodiment.

FIG. 6 is a block diagram of a special-purpose computing device that can optimize memory in VLSI design using generic memory models, according to one embodiment. In one exemplary embodiment, a non-transitory computer-readable medium (e.g., non-volatile memory 618) can store instructions which when executed implement the memory optimization process of an IC design. Alternatively, a representation of the IC design can be stored in the non-transitory computer-readable medium. The representation can be at a behavioral level, register transfer level, logic component level, transistor level, and layout geometry-level of the IC design.

In some embodiments, computer 600 comprises an interconnect or bus 602 (or other communication means) for transmission of data. Computer 600 can include a processing means such as one or more processors 604 coupled with bus 602 for processing information. Processors 604 can comprise one or more physical processors and/or one or more logical processors. While bus 602 is illustrated as a single interconnect for simplicity, it is understood that bus 602 can represent multiple different interconnects or buses. Bus 602 shown in FIG. 6 is an abstraction that represents any one or more separate physical buses, point to point connections, or both connected by appropriate bridges, adapters, controllers and/or the like.

In some embodiments, computer 600 further comprises a random access memory (RAM) or other dynamic storage device depicted as main memory 612 for storing information and instructions to be executed by processors 604. Main memory 612 can include an active storage of applications including a browser application for using in network browsing activities by a user of computer 600. Main memory 612 can further include certain registers or other special purpose memory.

Computer 600 can also comprise a read only memory (ROM) 616 or other static storage device for storing static information and instructions for processors 604. Computer 600 can further include one or more non-volatile memory elements 618 for the storage of certain elements, including, for example, flash memory, a hard disk, solid-state drive. Non-volatile memory elements 618 can store a representation of the IC design described above with references to FIGS. 1 through 5, or components within the IC design, can be stored as data. The representation can be at a behavioral level, register transfer level, logic component level, transistor level, and layout geometry-level of the IC design.

Computer 600 can comprise transceiver module 620 that is coupled to bus 602. Transceiver module 620 can further comprise a transmitter module and a receiver module. Transceiver module 620 comprises one or more ports 622 to connect to other devices (not shown).

Computer 600 can also comprise circuit logic 640 coupled to bus 602 and configured to detect information from a second device (not shown) coupled through ports 622. Computer 600 can also comprise output display 626 and coupled via bus 602. In some embodiments, display 626 can include a liquid crystal display (LCD) or any other display technology, for displaying information or content to a user, including three-dimensional (3D) displays. Alternatively, display 626 can include a touch screen that can also be part of input device 624. In some environments, display 626 can include an audio device, such as a speaker for providing audio information. Computer 600 can also comprise power device 630 that can comprise a power supply, a battery, a solar cell, a fuel cell, or other device for providing or generating power. Any power provided by power device 630 can be distributed as required to elements of computer 600.

While particular embodiments and applications of the present disclosure have been illustrated and described, it is to be understood that the embodiments are not limited to the precise construction and components disclosed herein and that various modifications, changes and variations may be made in the arrangement, operation and details of the method and apparatus of the present disclosure disclosed herein without departing from the spirit and scope of the disclosure as defined in the appended claims.

What is claimed is:

1. A method performed by a computer system for designing an integrated circuit that contains at least two memory instances, the method comprising:
    accessing a listing of memory instances, the listing generated from a register transfer level (RTL) description of the integrated circuit, wherein the RTL description includes calls to a generic memory model of the memory instances, each call for a memory instance using (a) a generic memory call interface for the generic memory model, the generic memory call interface including a set of memory parameters, and (b) memory parameters for the memory instance; wherein the listing includes the memory parameters for each memory instance; and
    for each such memory instance in the listing, processing the generic memory model using memory parameters corresponding to the memory instance to synthesize a specific memory model for the memory instance, wherein the specific memory model is useable in a later step in a flow for designing and fabricating the integrated circuit.

2. The method of claim 1 further comprising:
    for each such memory instance in the listing, processing the generic memory model using memory parameters corresponding to the memory instance to synthesize a plurality of specific memory models for the memory instance, wherein the different specific memory models are useable in different later steps in the flow for designing and fabricating the integrated circuit.

3. The method of claim 1 wherein the specific memory model is a Verilog model, and the later step in the flow is a functional simulation step in the flow.

4. The method of claim 3 wherein the Verilog model is a .v model.

5. The method of claim 1 wherein the specific memory model is a timing model, and the later step in the flow is a synthesis step in the flow.

6. The method of claim 5 wherein the timing model is a .lib model.

7. The method of claim 1 wherein the specific memory model is a test model, and the later step in the flow is a test development step in the flow.

8. The method of claim 1 wherein the specific memory model is a layout abstract, and the later step in the flow is a place and route step in the flow.

9. The method of claim 8 wherein the layout abstract is a .lef layout abstract.

10. The method of claim 1 further comprising:
    collecting the specific memory models into a library useable in the later step in the flow for the integrated circuit.

11. The method of claim 1 wherein the set of memory parameters for the generic memory call interface includes a parameter defining a number of words in a memory, a parameter defining a number of bits in each word, and at least one of: a parameter defining a number of read/write ports in the memory, a parameter defining whether an output of the memory is pipelined or non-pipelined, a parameter defining whether bit-write is enabled for the memory, a parameter defining read activity rate, a parameter defining write activity rate, a parameter defining a clock for the memory, a parameter defining a desired row/col option for the memory, and a parameter defining whether to implement the memory with a flip-flop.

12. The method of claim 1 wherein the set of memory parameters for the generic memory call interface includes a parameter defining a number of words in a memory, a parameter defining a number of bits in each word, and at least one of: a parameter defining whether to generate "X" unknown memory output read data, a parameter defining whether to generate "X" unknown memory output read data when read/write to a same memory address, a parameter defining whether to check read/write to a same address in the memory, a parameter defining whether to check for unknown write data bus, and a parameter defining whether to check for unknown read data.

13. The method of claim 1 wherein the set of memory parameters for the generic memory call interface includes a parameter defining a number of words in a memory, a parameter defining a number of bits in each word, and at least one of: a parameter indicating whether to use the highest performance memory, and a parameter indicating whether to use the lowest leakage memory.

14. The method of claim 1 wherein the generic memory model can accommodate different technology nodes.

15. The method of claim 1 wherein the generic memory model can accommodate memory models synthesized by different memory compilers.

16. The method of claim 1 wherein the generic memory model is modifiable without requiring modification to the RTL description of the integrated circuit or the call to the generic memory model.

17. The method of claim 16 wherein the generic memory model is modified as the flow for the integrated circuit progresses, in order to allow synthesis of specific memory models that could not be synthesized prior to the modification.

18. The method of claim 1 wherein the memory parameters are defined in a file separate from the RTL description.

19. The method of claim 1 wherein the generic memory model is written in synthesizable Verilog RTL or SVerilog RTL.

20. A non-transitory computer-readable storage medium storing executable computer program instructions for designing an integrated circuit that contains at least two memory instances, the instructions executable by a processor and causing the processor to perform a method comprising:

accessing a listing of memory instances, the listing generated from a register transfer level (RTL) description of the integrated circuit, wherein the RTL description includes calls to a generic memory model of the memory instances, each call for a memory instance using (a) a generic memory call interface for the generic memory model, the generic memory call interface including a set of memory parameters, and (b) memory parameters for the memory instance;

wherein the listing includes the memory parameters for each memory instance; and for each such memory instance in the listing, processing the generic memory model using memory parameters corresponding to the memory instance to synthesize a specific memory model for the memory instance, wherein the specific memory model is useable in a later step in a flow for designing and fabricating the integrated circuit.

* * * * *